Patented May 29, 1951

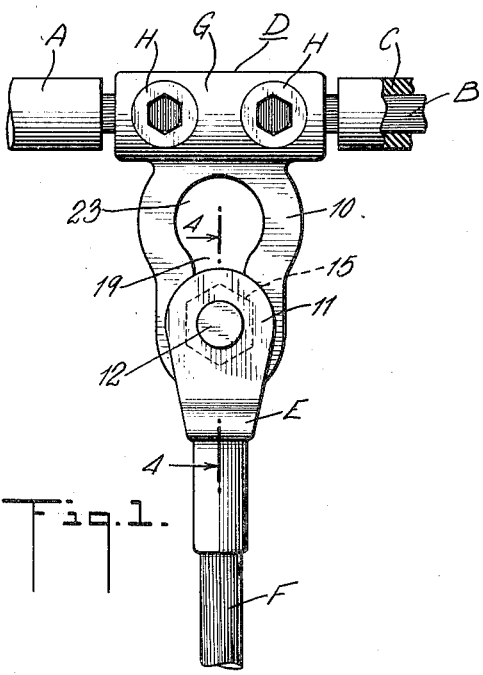
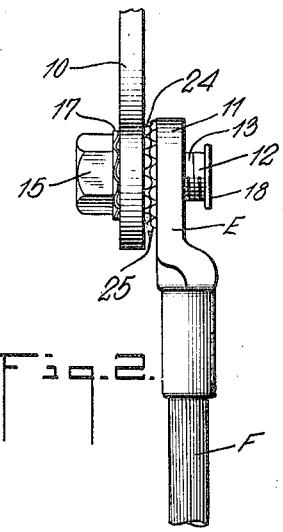
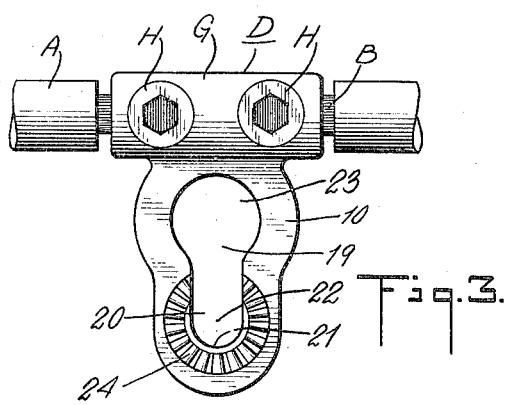
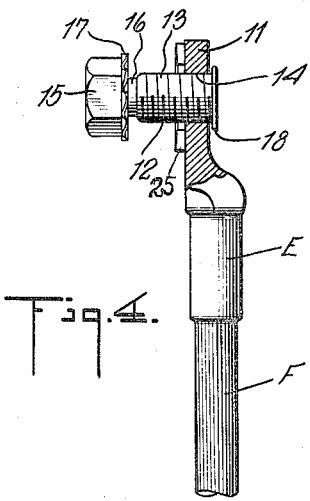
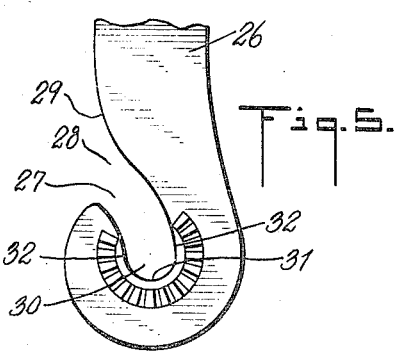

2,555,074

UNITED STATES PATENT OFFICE 2,555,074

DISCONNECT LUG

Martin D. Bergan, Westfield, N. J., assignor to The Thomas & Betts Co., Elizabeth, N. J., a corporation of New Jersey Application January 26, 1946, Serial No. 643,556

1 Claim. (Cl. 173—273)

The invention relates in general to an electric connector for attaching a tap to a main power line for the purpose of taking current therefrom, and specifically relates to an improvement in the means for replaceably connecting the tap to a main element in turn secured to the power line.

In such devices now known it is a common practice to provide the tap with a terminal having a flat faced projection or plate-like tang; to provide the main element of the connector with an accessory tab usually in the form of a flat plate; to overlap the tab and tang plates and to pass a securing bolt axially through the aligned bolt holes therein. With some known forms of such devices it has been necessary further to install a nut on the shank of the bolt and to hold one while rotating the other in securing the plates together. It is obviously difficult, especially under bad weather and other adverse conditions, where such connections have to be made, first to get the bolt holes into alignment and then to insert the bolt through the holes while restraining the holes from shifting before the bolt can be inserted in place. This practice has caused great inconvenience to the busy linesman particularly under emergency conditions where he must install or replace a tap quickly, accurately, and securely, and this must be done of course without necessity for him to look for loose pieces of the connector.

The primary object of the invention is to provide a simplified structure which will facilitate an improvement in the technique for quickly assembling the detachable parts of the connector and to do this without necessity of aligning any bolt holes and to secure the parts to each other positively in any desired angular relation with the assurance that vibration and other service conditions will not subsequently loosen the connection.

Broadly the invention features the omission of any bolt, nut or other loose pieces; the reduction of the connector to two simple parts; the providing of one of the parts with a headed bolt secured to the same, and providing the other part with a bolt hole open on one side for receiving the bolt inserted therein laterally, either from an edge or from a larger hole and then shifted into its prefixed clamping position without further attention to its location.

Such forms of tap connectors frequently require that the tap extend at some preferred angle to the length of the main line. In known forms of such devices where dependence is placed simply upon the frictional engagement between the contacting faces of the separable plates to provide resistance to turning, the vibration of the main line, of the tap or both, have a tendency to cause the parts to shift from their initially installed positions with the tap hanging vertically from the connector.

Accordingly the present disclosure has for another object the providing of an interlock between the detachable parts, with or without a lock washer, and arranged so that when the parts are preset angularly and the bolt tightened the parts will remain as so set so long as the bolt is not forceably re-rotated to loosen the same intentionally.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the drawings:

Fig. 1 is a view in front elevation of a disconnect device or connector forming a preferred embodiment of the invention connecting a tap with a main line;

Fig. 2 is a view in side elevation of the lower portion of the disclosure of Fig. 1;

Fig. 3 is a view in front elevation of the upper or female element of the connector of Fig. 1 with the tap including the male element of the connector omitted;

Fig. 4 is a vertical sectional view of the tap of Figs. 1 and 2 and taken on the line 4—4 of Fig. 1 with the bolt of the male element in its retracted position and;

Fig. 5 is a view similar to that of Fig. 3 and showing a modified hook-like form of the female element of the invention.

In the drawings and referring primarily to the showings in Figs. 1–4, there is disclosed a main line A with its conductors B at the core of its insulation C. The insulation is cut away as shown in Fig. 1 and in this cut away portion is mounted the connector D formed of conductive material and which acts to conduct electric energy from the main line A to the terminal E of a tap F following conventional practices in this respect. Also following known devices the connector D includes a sleeve G clamped about the conductors B by bolts H and is intended to be representative of all sorts of main line connectors now in general use.

The distinctive feature of the disclosure is a readily demountable interlock between an accessory tab, herein shown to be simply a flat plate 10 forming an integral extension depending from the sleeve G, and the tang 11 forming an integral extension from the tap terminal E, with the plate and tang in flat abutting mechanical and electric relation and connected in interbearing engagement by a through bolt 12.

The bolt 12 has a shank portion 13 threaded through a bolt hole 14 formed in the tang 11 and is provided with a rugged head 15. The portion of the shank as it joins the head is slightly reduced to form an annular groove 16 and in this groove is fitted a lock washer 17 disposed as shown in Fig. 2 between the head and the plate 10 to defeat any tendency of the bolt to rotate away from its locked position. The locating of the washer in the groove close to the head defeats any tendency of the washer to leave the head.

The other threaded end of the nut is peened to form an upset 18 of sufficient size, as best shown in Fig. 4, to prevent withdrawal or backing of the bolt from the terminal tang 11.

The bolt 12 and lock washer 17 thus become fixed parts of the terminal E and as the terminal is secured to the tap F all of the parts shown in Fig. 4 are integrally connected and form in effect a hook-like end to the terminal.

The plate or accessory tab 10, herein sometimes referred to as the female element of the connection is provided with a key-hole shaped opening 19 which is peculiarly dimensioned relative to the bolt. The lower portion 20 of the hole is of relatively narrow width, just sufficient to permit the shank 13 of the bolt to move freely therein but is of too small a dimension to permit the head 15 of the bolt 12, or the washer 17, which ever is the larger, to pass therethrough. The lower edge 21 of the hole is semicircular with its center at the point 22 and this lower edge acts as a stop to limit the downward movement of the bolt shank as it is lowered into its operative position as shown in Figs. 1 and 2.

The upper portion 23 of the opening 19 is larger than the lower portion and is sufficiently large in all of its radial dimensions to permit the head 15 of the nut and washer 17 to pass freely therethrough in any rotative positions of the terminal. The portion of the opening 19 between the large upper portion 23 and the smaller lower shank seating portion 20 forms a channel for guiding the bolt shank into position.

It is a feature of this disclosure that the plate 10 and terminal E be locked from relative movement about the axis of the bolt when the tang 11 is preset firmly against the plate 10. For this purpose the plate 10 is provided with a set of teeth, serrations or projections 24 arranged, as shown in Fig. 3, in a broken circle about the center 22 and closely outlining the lower portion 20 of the opening 19. Similarly the tang 11 is provided on the side thereof facing the bolt head with a corresponding circular set of teeth, serrations or projections 25 completely encircling the bolt hole 14 and matching the teeth 24. The two sets of teeth are disposed to fit one within the other when in opposiion and fixed relative to each other as when the bolt is fully advanced into its locked position. The teeth-like serrations 24 and 25 are embossed integral with the plate 10 and tang 11 respectively, but of course might be machined in suitable rims formed on these members for this purpose.

In operation and assuming that the female unit comprising the sleeve G and its accessory tab 10 is secured to the main line A and that the tap F is secured to its terminal E to form the corresponding male element, the bolt 12 is retracted to project the same together with its washer 17 into the distended position shown in Fig. 4 and thus into a position to form a hook with the portion of the shank exposed between the teeth 25 and the lock washer 17. The headed end of the bolt is then hooked into the wide open portion 23 of the key hole opening 19 and then lowered into engagement with the stop 21. This brings the teeth of the two sets in opposition to each other and into a concentric relation. While the tap F is illustrated as depending at right angles to the length of the main line A it is often required that the tap extend at some other angle. In this case the terminal E is shifted angularly about the axis passing through the point 22 until the desired angular relation between plate 10 and terminal E is obtained. By means of a suitable tool engaging the head of the bolt the plate 10 and tang 11 are thus drawn together, the teeth of one of the sets finding their way into the troughs formed between the teeth of the other set. The bolt is finally drawn down tight to cause the lock washer to function as shown in Fig. 2 and the parts are thus locked together.

Should it be desired to disconnect the tap from the balance of the connector, it is similarly necessary to loosen the bolt and then the terminal can be lifted sufficiently to permit the bolt shank to move into the portion 23 of larger dimension of the opening 19 and thus the terminal can be unhooked by moving the bolt longitudinally outward from the female element and free of the parts remaining clamped onto the main line.

With reference to the modified form of the invention shown in Fig. 5, the plate 26, corresponding to the plate or accessory tab 10 is of a J-shaped or hook form. That is instead of the closed opening 19 shown in the preceding figures, the plate 26 is provided with an open recess 27, having an entrance portion 28 opening along an edge 29 and terminating at the center of the hook into a bolt shank receiving portion 30 corresponding to the portion 20 of the preceding figures and thence surrounded by a broken circle of teeth 24.

In this case the associated bolt 12 as shown in Fig. 4 is passed laterally through the entrance portion 28 along a channel opening into the side of the portion 30 and onto the seat 31 provided at the bottom of the portion 30. The opposing side walls 32 outlining the recess 27 defines the channel and acts as guides to assist the bolt in finding its way towards the seat. The bolt is then tightened to secure the tap to the hook plate 26 as previously described for the preferred form.

I claim:

An article of manufacture forming an electric disconnect lug comprising two readily separable parts each formed of a conductive material disposed with one hanging from the other in relatively depending relation, the upper of the two parts comprising a long sleeve adapted to be clamped to a main line to be supported therefrom and a flat plate forming an extension depending from the sleeve in a plane parallel to its axis, said plate provided with a key-hole-shaped opening with its upper end adjacent the sleeve being wider than its lower end, the lower edge of the opening forming an upwardly-facing bolt seat, the other part constituting a tap terminal depending below the plate and provided with a tang in flatwise contacting abutment with the plate and provided with a captured bolt having a cylindrical shank permanently threaded through the tang, extending at right angles thereto and forming a rigid hook for engaging in the key-hole opening and adapted to be lowered or to fall gravitationally with the terminal into engagement with said seat, said bolt provided with a head of less width than the upper portion of the key-hole opening to permit the passage of the head axially therethrough and of greater width than the portion of the key-hole opening which forms the seat to defeat accidental removal of the bolt when so seated and said bolt fashioned to be rotated by turning its head to move the head into bearing engagement with the tang to clamp the tang to the plate in electric contacting relation, the bolt dimensioned to have its shank rockably fitted to the seat, and said plate provided with an incomplete circle of teeth encircling the lower portion of the key-hole opening with the center of the tooth circle coinciding with the center of the seat, and said tang provided with a circle of teeth surrounding the bolt and said bolt when advanced by the rotation of its head operative to cause the teeth in the plate and tang to intermesh and thus secure the terminal in preset angular relation to the long sleeve.

MARTIN D. BERGAN.

REFERENCES CITED

The following references are of record in the file of this patent:

UNITED STATES PATENTS

| Number | Name | Date |
| --- | --- | --- |
| 929,381 | Bosnyakovits | July 27, 1909 |
| 955,747 | Barcy | Apr. 19, 1910 |
| 956,548 | Tingley | May 3, 1910 |
| 968,950 | Jahn | Aug. 30, 1910 |
| 998,304 | Robertson | July 18, 1911 |
| 1,213,632 | Hammond | Jan. 23, 1917 |
| 1,518,460 | Smith | Dec. 9, 1924 |
| 1,945,575 | Sumpter | Feb. 6, 1934 |
| 1,993,968 | Lee | Mar. 12, 1935 |
| 2,194,411 | Tipsord | May 19, 1940 |
| 2,254,288 | Holleran | Sept. 2, 1941 |
| 2,309,607 | Rogoff | Jan. 26, 1943 |
| 2,345,671 | Heffner et al. | Apr. 4, 1944 |
| 2,393,481 | Smith | Jan. 22, 1946 |

FOREIGN PATENTS

| Number | Country | Date |
| --- | --- | --- |
| 226,120 | England | Dec. 18, 1924 |